(No Model.)
H. C. SERGEANT.
HOSE COUPLING.
No. 314,066. Patented Mar. 17, 1885.
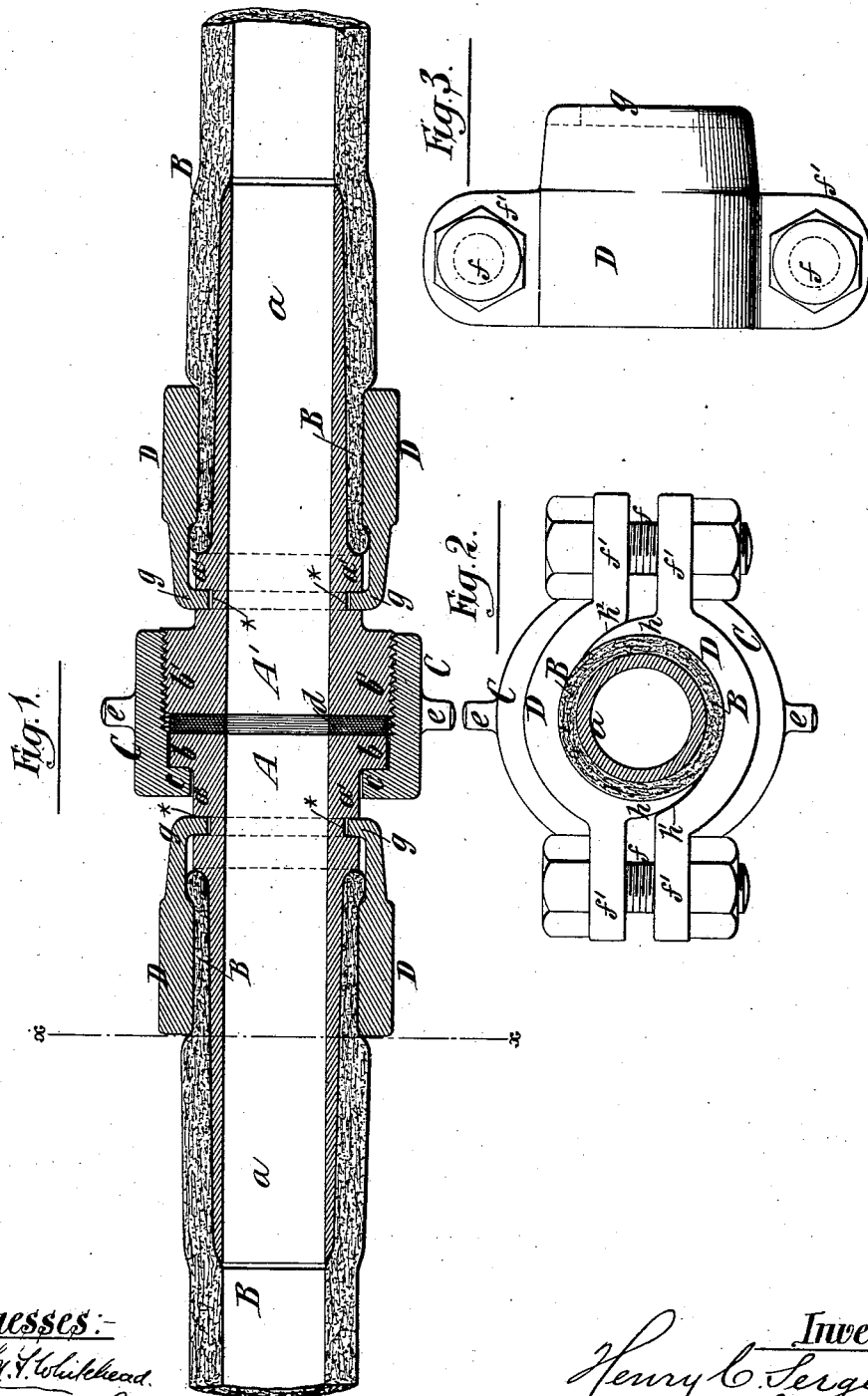

UNITED STATES PATENT OFFICE.

HENRY C. SERGEANT, OF NEW YORK, N. Y.

HOSE-COUPLING.

SPECIFICATION forming part of Letters Patent No. 314,066, dated March 17, 1885.

Application filed May 15, 1884. (No model.)

*To all whom it may concern:*

Be it known that I, HENRY C. SERGEANT, of the city and county of New York, in the State of New York, have invented a new and useful Improvement in Hose-Couplings, of which the following is a specification.

My invention relates to those couplings in which the end portion of the hose is slipped upon or over a shank or nipple, and there secured by a two-part or divided clamp, which compresses the hose and securely binds it upon the shank or nipple. The clamp in common use consists of two nearly semicircular parts provided with projecting ears, through which are inserted the bolts for drawing the parts of the clamp together and tightening them upon the hose, and in order to afford provision for tightening the clamp at any time the parts are so formed that they can never be drawn completely together, as that would prevent any further tightening. Because of this peculiarity, the hose, when the clamp is applied, has always had a tendency to bulge outward between the two parts, and to thus prevent the tight clamping of the hose at such points, as well as to impede the further clamping by being pinched between the said two parts of the clamp.

The object of my invention is to obviate the above-described difficulty and to provide a clamp which will confine the hose so that it cannot bulge out between the two parts; and to this end the invention consists in providing the parts of the clamp with lips or guards, which project circumferentially beyond the ears through which the tightening-bolts are inserted and enter the other parts of the clamp. These lips or guards bridge over or extend across the division or opening between the parts of the clamp, and such a clamp will confine and clamp the hose around its entire circumference. Preferably each part of the clamp will be provided at one side with a lip or guard, as above described, and the two parts of the clamp may then be cast from the same pattern, and when reversed the two lips or guards will project each from one part of the clamp into the other part.

In the accompanying drawings, Figure 1 is a longitudinal section of a coupling embodying my invention. Fig. 2 is a transverse section on the dotted line $x$ $x$, Fig. 1; and Fig. 3 is a plan of one of the two parts of the clamp employed.

Similar letters of reference designate corresponding parts in all the figures.

A A' designate the two parts of the coupling, each of which has a long and externally-tapered shank, $a$, upon which are slipped and secured the two portions B of hose to be connected. The part A of the coupling is provided with a projecting flange, $b$, and the part A' with an externally screw-threaded flange or enlargement, $b'$, and the two parts are connected by a swiveled nut or horn-band, C, having an internal flange, $c$, which engages with the flange $b$ of the part A, and is capable of turning thereon to screw it upon or unscrew it from the flange $b'$ of the part A' of the coupling. A packing, $d$, is placed between the flanges $b$ $b'$, and by turning up the horn-band C the said packing is clamped between the two parts to make a tight joint. The band or nut C is provided with horns $e$, with which a wrench or spanner may be engaged for turning the band or nut C.

The two sections of hose B are slipped upon the taper shanks $a$ of the parts A A', and are there secured each by a two-part or divided clamp, D D, which are tightened upon the hose by bolts $f$, passing through lugs or ears $f'$, with which the parts of the clamp are provided. Forward of that part of each shank $a$ on which the hose B is slipped is an annular external enlargement, $a'$, which is of about the same diameter as the hose after the clamp is applied, and in this enlargement is an annular groove or notch *. The flange $c$ of the horn-band C is internally of a size to slip easily over the annular enlargement $a'$; but no notches are necessary therein, as there are no projections beyond the cylindric periphery of the enlargement $a'$.

The parts D of the clamp are provided with forwardly-projecting hooks $g$, which are preferably nearly semicircular in transverse section, and which, as the parts of the clamp are drawn together, pass into the groove or notches *, and thereby hold the clamp, and through it the hose, from slipping off the shank $a$ of the coupling.

In order to prevent the hose B from bulging out between the two parts of the clamp, I provide the clamp with lips or guards $h$, which project beyond the ears or lugs $f'$ and enter the opposite part of the clamp. As here shown, each part D has such a lip or guard, which is received in a slightly chamfered or cut-out seat, $h'$, in the opposite part, and, as the parts of the clamp are drawn together, the lips or guards $h$ are confined and pressed inward upon the hose B. By the said lips or guards the bulging out of the hose between the two parts of the clamp is prevented, and it is confined and clamped around its entire circumference.

What I claim as my invention, and desire to secure by Letters Patent, is—

The combination, with a coupling, of a two-part hose-clamp having ears $f'$, for the reception of tightening-bolts, and provided with lips or guards $h$, projecting circumferentially beyond the face of one part across the division or gap between the two parts, substantially as and for the purpose herein described.

H. C. SERGEANT.

Witnesses:
 C. HALL,
 FREDK. HAYNES.